J. B. WILLYERD.
COMBINED PORTABLE PHOTOGRAPHIC APPARATUS AND DARK ROOM.
APPLICATION FILED NOV. 18, 1908.
929,808.
Patented Aug. 3, 1909.
2 SHEETS—SHEET 1.
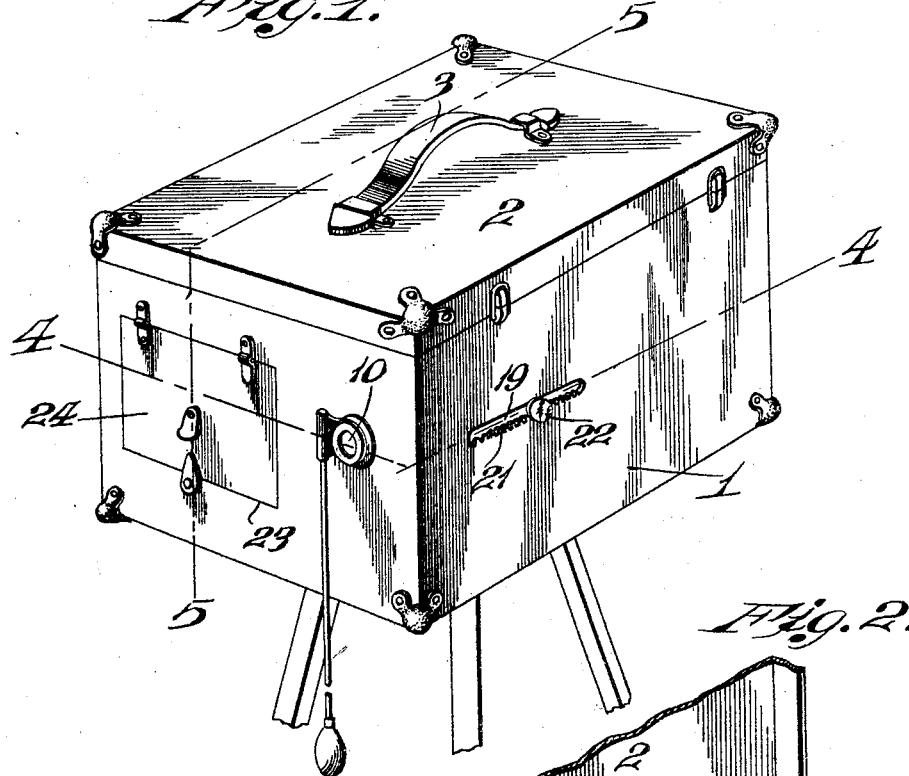
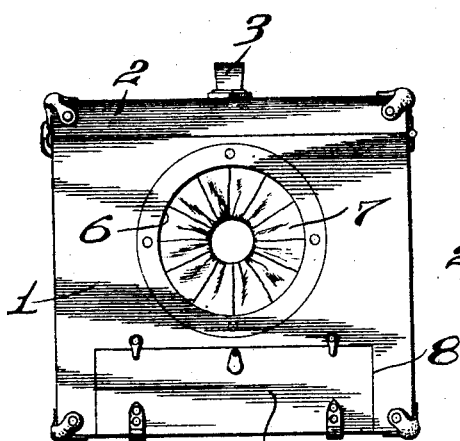
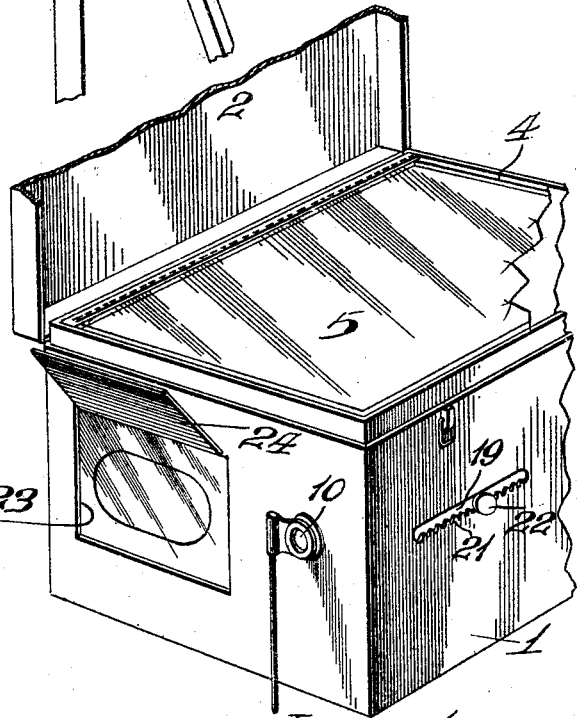

J. B. WILLYERD.
COMBINED PORTABLE PHOTOGRAPHIC APPARATUS AND DARK ROOM.
APPLICATION FILED NOV. 18, 1908.
929,808.
Patented Aug. 3, 1909.
2 SHEETS—SHEET 2.
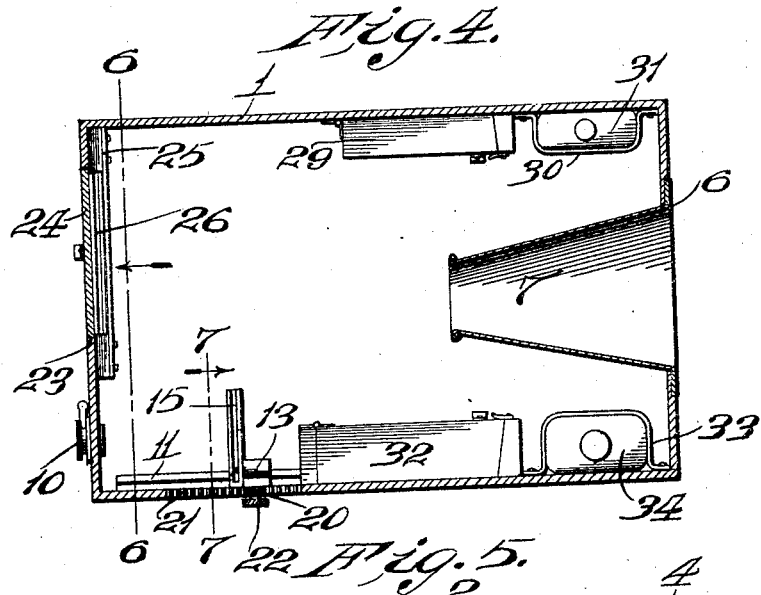
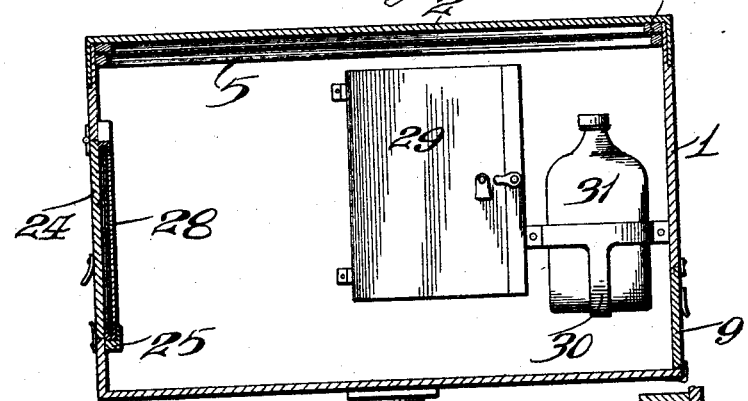
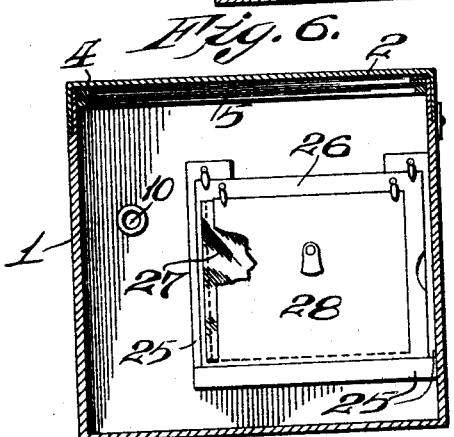
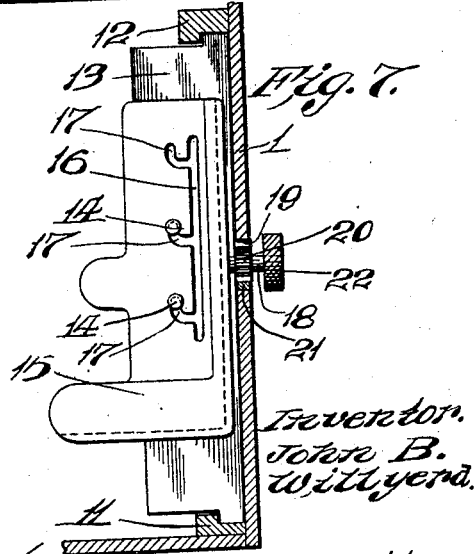
Inventor.
John B. Willyerd.
By Higdon & Longan, Attys.
Attest.
H. G. Fletcher.
M. O. Smith.

UNITED STATES PATENT OFFICE.

JOHN B. WILLYERD, OF ST. LOUIS, MISSOURI.

COMBINED PORTABLE PHOTOGRAPHIC APPARATUS AND DARK ROOM.

No. 929,808.　　　Specification of Letters Patent.　　　Patented Aug. 3, 1909.

Application filed November 18, 1908. Serial No. 463,135.

*To all whom it may concern:*

Be it known that I, JOHN B. WILLYERD, a citizen of the United States, and resident of St. Louis, Missouri, have invented certain new and useful Improvements in a Combined Portable Photographic Apparatus and Dark Room, of which the following is a specification containing a full, clear, and exact description, reference being had to the accompanying drawings, forming a part hereof.

My invention relates to a combined portable photographic apparatus and dark room, the object of my invention being to construct a simple, convenient and compact apparatus particularly adapted for making photographic negatives, developing and fixing the same, and then printing pictures from said negatives upon sensitized sheets or cards, which latter are subjected to the developing and fixing baths and are then ready for delivery.

A further object of my invention is to construct a simple photographic apparatus and to provide the same with an opaque outer cover and with a transparent inner cover of colored celluloid or glass, which will readily permit an inspection of the interior of the apparatus while the negatives are being developed and the pictures being printed therefrom, and which inner cover is of such color as to cut off the actinic rays of light from the interior apparatus.

To the above purposes my invention consists of certain novel features of construction and arrangement of parts hereinafter more fully set forth, pointed out in the claims and illustrated in the accompanying drawings, in which—

Figure 1 is a perspective view of an apparatus of my improved construction, looking at the front end thereof; Fig. 2 is a perspective view of the apparatus showing the outer cover elevated and the cover of the printing aperture elevated; Fig. 3 is a rear elevation of the apparatus; Fig. 4 is a horizontal section taken approximately on the line 4—4 of Fig. 1; Fig. 5 is a vertical section taken approximately on the line 5—5 of Fig. 1; Fig. 6 is a vertical section taken on the line 6—6 of Fig. 4; Fig. 7 is an enlarged vertical section taken on the line 7—7 of Fig. 4 and illustrating the adjustable plate holder of my improved apparatus.

Referring by numerals to the accompanying drawings: 1 designates the body of my improved apparatus, which is in the form of a rectangular box which may be mounted on a tripod or suitable base, and adapted to normally close the top of the box is a hinged outer cover 2, provided with a handle 3, by means of which the apparatus is carried, and hinged to one side wall of the box and occupying a position immediately beneath the cover 2 is a rectangular frame 4, to which is fitted a section 5 of transparent red celluloid or glass, which construction permits a view of the entire interior of the body 1, while the operator is developing a negative or printing pictures therefrom, and by reason of the celluloid or glass being red in color, the actinic rays of light are prevented from entering the apparatus and affecting the undeveloped negative or unfixed picture.

Formed in the rear end wall of the body 1 is a circular opening 6 and fixed to the end wall around this opening is the edge of a flexible sleeve 7, preferably of dark cloth or rubber, the opposite end of which is adapted to snugly fit around the wrist of the operator, and said sleeve being of such length as that it can be withdrawn from the body 1 and collapsed so as to prevent the light from entering the interior of the box.

An opening 8 is formed through the lower portion of the rear wall of the box, which opening is normally closed by a hinged door 9 and this construction permits the pans containing the developing and fixing baths to be placed within and removed from the box.

Arranged in the left-hand portion of the front wall of the box 1 is an ordinary photographic lens and shutter 10, which is operated in any suitable manner.

Located on the bottom of the box immediately against the left-hand side wall thereof, is a grooved rail or guide 11, and fixed on the inner face of the left-hand side wall of the box above and parallel with this rail 11 is a second rail 12. Arranged to slide between these rails is a vertically disposed block 13, on the front side of which is fixed a pair of pins 14, and positioned against the front side of this block 13 is a plate holder 15, provided with a vertically disposed slot 16, and extending laterally therefrom are branch slots 17, which are adapted to receive the pins 14, thus making the plate holder vertically adjustable upon the block 13.

Arranged for rotation in the block 13 is a short shaft 18, which projects through a horizontally disposed opening 19 formed in the left-hand side wall of the box, and said shaft is provided with a pinion 20, which meshes with rack teeth 21 formed in the left-hand side wall of the box immediately below the slot 19.

Fixed on the outer end of the shaft 18 is a disk 22, which provides means for rotating said shaft 18, which action causes the pinion 20 to engage with the rack teeth 21, thereby shifting the block 13, carrying the plate holder 15, backward or forward as desired.

Formed in the front wall of the box 1 is a rectangular opening 23, and normally closing the same is a hinged door 24. Fixed to the inside of the front wall of the box below and at the sides of this opening 23 are rails or strips 25 and detachably positioned therein is a rectangular frame 26, provided with a section 27 of transparent uncolored celluloid or glass, and detachably held within the frame 26 and adapted to bear against this section of celluloid or glass is a rectangular plate 28.

Hinged to the inner face of the right-hand side wall of the box is a receptacle 29, which is adapted to hold sensitized cards or sheets on which pictures are to be printed, and fixed on this same side wall adjacent the pans 29, is a skeleton pocket 30, which is adapted to receive a bottle 31 containing the developing or fixing solution.

Hinged to the inside face of the opposite side wall of the box is a receptacle 32 adapted to contain sensitized plates to be used in making negatives, and located on said side wall adjacent this receptacle is a skeleton pocket 33, which holds a bottle 34 adapted to contain a developing or fixing solution.

To make a negative with my improved apparatus, the operator inserts one hand through the sleeve 7, opens the receptacle 32 and removes the plate therefrom, which plate is then positioned in the plate holder 15. This plate holder may be adjusted vertically upon the pins 14 to bring the object being photographed directly onto the center of the plate, and the block 13 carrying the plate holder is adjusted backward and forward by rotating the shaft 18 in order to obtain the proper focus. After the proper adjustment and focus have been obtained, the shutter of the lens 10 is opened, thus making the exposure, and the exposed plate is now removed from the plate holder and placed in the developing solution which is contained in a tray suitably located on the bottom of the box. During this operation the cover 2 is swung into an open position and the operator now has a clear view of the interior of the box through the section of red celluloid or glass 5, and when the exposed plate has been properly developed, it is placed in the fixing bath in a second tray on the bottom of the box. The trays for the developing and fixing baths are placed in a box through the opening 8, and the solutions for said baths are withdrawn from the supplies contained in the bottles 31 and 34.

After the exposed plate has been fixed, the plate 28 is detached from the frame 26 and the exposed plate is positioned immediately against the section 27 of uncolored celluloid or glass, and a sensitized card or sheet from the supply contained within the receptacle 29 is placed immediately against the negative, after which the plate 28 is replaced in the frame 26, thus pressing the sensitized card or sheet against the negative. The door 24 is now opened to accomplish the printing operation, after which the negative and card or sheet are removed from the printing aperture and the card or sheet is subjected to the proper bath or baths and after being dried is ready for delivery.

An apparatus of my improved construction is very simple, compact, can be readily transported, and by its use photographic prints are easily, quickly and cheaply produced. The plate holder within the box may be readily adjusted to obtain the proper focus, and by providing the section 5 of colored celluloid or glass the entire interior of the box may be readily viewed while performing the various operations necessary to produce the finished pictures.

I claim—

1. In an apparatus of the class described, a box having an open top, an opaque cover hinged to the box and adapted to normally close the open top thereof, a colored transparent cover arranged in the top of the box beneath the opaque cover, a combined lens and shutter arranged in one of the walls of the box and there being a normally closed printing opening formed in one of the walls of the box.

2. In an apparatus of the class described, a box having an open top, a section of colored transparent material normally closing the top of the box, an opaque cover hinged to one side of the box and adapted to inclose the colored transparent section, a combined lens and shutter arranged in one of the walls of the box, and there being a normally closed printing opening formed in one of the walls of the box.

3. In an apparatus of the class described, a box having an open top, a frame hinged to the box at one side thereof, a section of colored transparent material carried by the frame to form a cover for the entire top of the box, an opaque cover hinged to one side of the box and inclosing the colored transparent section, a combined lens and shutter arranged in one of the walls of the box, and there being a normally closed printing opening formed in one of the walls of the box.

4. In an apparatus of the class described, a box, an inner cover of colored transparent material closing the top of the box, an outer cover hinged to the box and inclosing the inner cover, a combined lens and shutter located in one of the walls of the box, there being a normally closed printing opening formed in one of the walls of the box and an adjustable plate holder arranged within the box behind the lens and shutter.

5. In an apparatus of the class described, a box, an inner cover of colored transparent material closing the top of the box, an outer cover hinged to the box and inclosing the inner cover, a combined lens and shutter located in one of the walls of the box, there being a normally closed printing opening formed in one of the walls of the box, an adjustable plate holder arranged within the box behind the lens and shutter, and means whereby said plate holder is adjusted from the exterior of the box.

6. In an apparatus of the class described, a box having a printing opening formed in one end, a section of transparent material located in said opening, an opaque door normally closing said opening, and a plate adapted to be positioned against the inner face of the section of transparent material closing said printing opening.

7. In an apparatus of the class described, a box, in one wall of which is formed a printing opening, a door normally closing said opening, a frame detachably applied to the inside of the wall around said opening, a section of transparent material carried by said frame, and a plate detachably arranged in said frame and adapted to bear against the inner face of the section of transparent material.

8. In an apparatus of the class described, a box having an open top, an inner cover of colored transparent material normally closing the open top of the box, an outer cover for inclosing the inner cover, there being an arm opening formed in one wall of the box, a flexible sleeve, one end of which is fixed in the arm opening, a combined lens and shutter arranged in one wall of the box, an adjustable plate holder arranged in the box to the rear of the lens and shutter, there being a printing opening formed in one wall of the box, a door normally closing said printing opening, a frame on the interior of the box around the printing opening, a section of transparent material carried by the frame, and a plate detachably arranged in the frame and adapted to bear on the rear face of the section of transparent material.

In testimony whereof, I have signed my name to this specification, in presence of two subscribing witnesses.

JOHN B. WILLYERD.

Witnesses:
 M. P. SMITH,
 E. L. WALLACE.